Oct. 13, 1959     D. G. SMITH     2,908,336
LIFT TYPE OFFSET HARROW

Filed Nov. 22, 1955     4 Sheets-Sheet 1

INVENTOR
DONALD G. SMITH

BY
ATTORNEYS

Oct. 13, 1959  D. G. SMITH  2,908,336
LIFT TYPE OFFSET HARROW
Filed Nov. 22, 1955  4 Sheets-Sheet 2

INVENTOR
DONALD G. SMITH

BY
Cushman Darby Henderson
ATTORNEYS

Oct. 13, 1959 D. G. SMITH 2,908,336
LIFT TYPE OFFSET HARROW
Filed Nov. 22, 1955 4 Sheets-Sheet 3

INVENTOR
DONALD G. SMITH

BY
ATTORNEYS

Oct. 13, 1959  D. G. SMITH  2,908,336
LIFT TYPE OFFSET HARROW
Filed Nov. 22, 1955  4 Sheets-Sheet 4
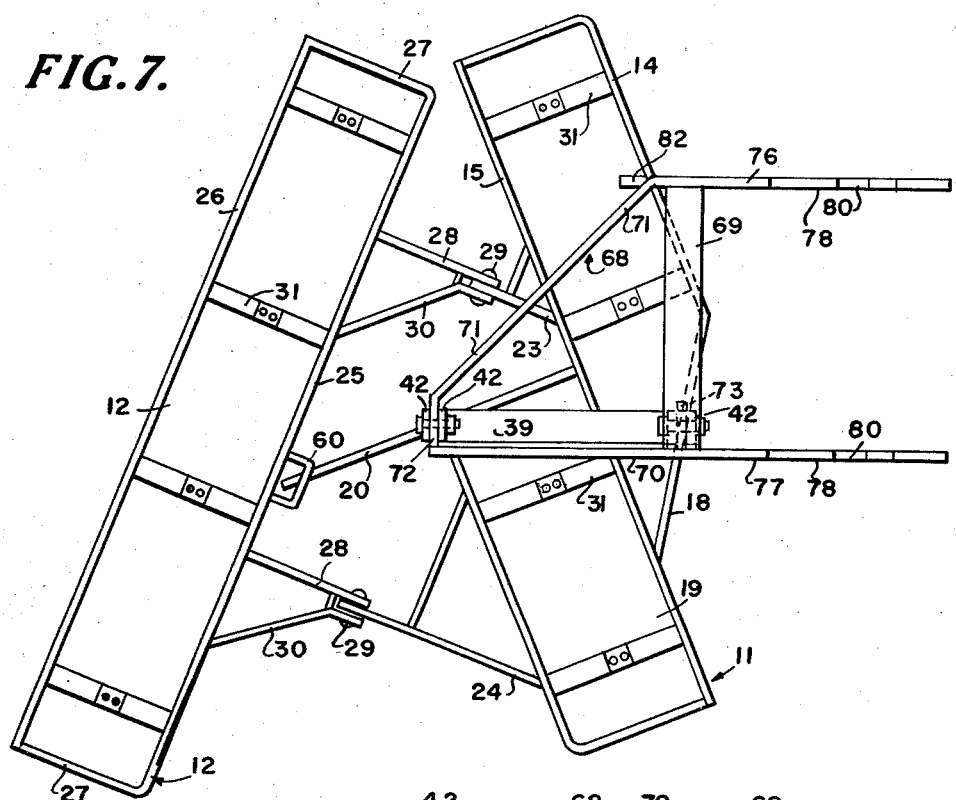
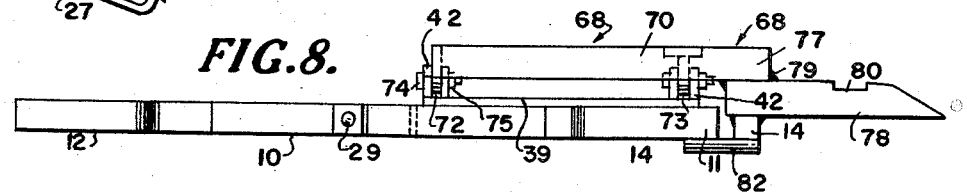
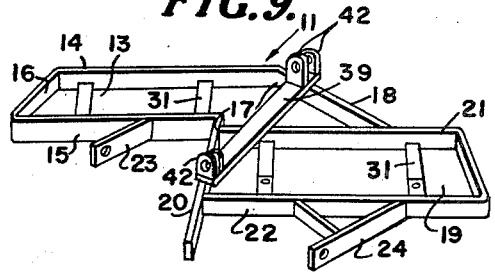
INVENTOR
DONALD G. SMITH United States Patent Office 2,908,336
Patented Oct. 13, 1959

2,908,336

LIFT TYPE OFFSET HARROW

Donald G. Smith, Jacksonville, Fla., assignor to Hester Plow Co., Inc., Jacksonville, Fla., a corporation of Florida Application November 22, 1955, Serial No. 548,430

8 Claims. (Cl. 172—441)

The present invention relates to improvements in the construction and operation of lift type offset harrows for grove cultivation.

Heretofore, harrows have been connected to tractors or the like through a three-pointed lift attachment connected to the tractor by a releasable hitch mechanism, and in such a manner as to remain level at all times to the tractor. Consequently, as the tractor tilts from side to side when travelling over rough or uneven ground, it forces the ends of the harrow to penetrate or gouge into the ground. This has been a serious objection to the use of these harrows, particularly in citrus and bedded grove cultivation.

Accordingly, an important object is to provide a mounted lift type offset grove harrow with simple, efficient and economical means for allowing the harrow to oscillate in a vertical plane and about an axis substantially parallel to the center line of the tractor, so that it will seek its own level or a substantially horizontal position, independently of the tractor.

A further object is to provide a lift type harrow with a front gang of discs and a rear gang of discs disposed at an acute angle relative to the front gang. The front and rear gangs are movably connected at spaced, transverse points so as to allow the rear gang to raise and fall independently of the front gang and, also, to provide a floating connection of the rear gang with the front gang, in order to let the harrow pass over uneven ground without plowing into the high spots or scraping over the hollows.

A still further object consists in connecting the harrow to a tractor or the like through a three-point hitch frame assembly having an offset longitudinal pivotal connection with the harrow, so as to allow the harrow to oscillate in a vertical plane and about an axis positioned on one side of the hitch frame so as to be substantially parallel with the center line of the tractor and close to the center of gravity of the harrow. Additionally, the hitch frame is provided with stop means engageable with the harrow for limiting the downward travel of the harrow, so as to prevent the opposite sides thereof from touching the ground when moved to a tilted or raised position.

Another object is to provide a lift type harrow with a hitch frame having spaced harrow prongs releasably connected to an automatic coupling carried by the tractor, so that the harrow may be connected to or disconnected from the implement without the operator dismounting from the tractor.

Other objects and advantages of the invention will become apparent from the following description when taken in conjunction with the accompanying claims and drawings.

Referring to the drawings in which are shown several preferred embodiments the invention may assume:

Figure 2 is a plan view of the harrow showing the hitch frame connected to the lift attachment of a tractor or the like;

Figure 7 is a detailed plan view of the gang harrow showing a modified form of a hitch frame having spaced prongs for detachably connecting the harrow to the tractor;

Figure 8 is a side view of Figure 7; and

Figure 9 is a detailed perspective view of the front gang frame of the harrow.

Figure 1:
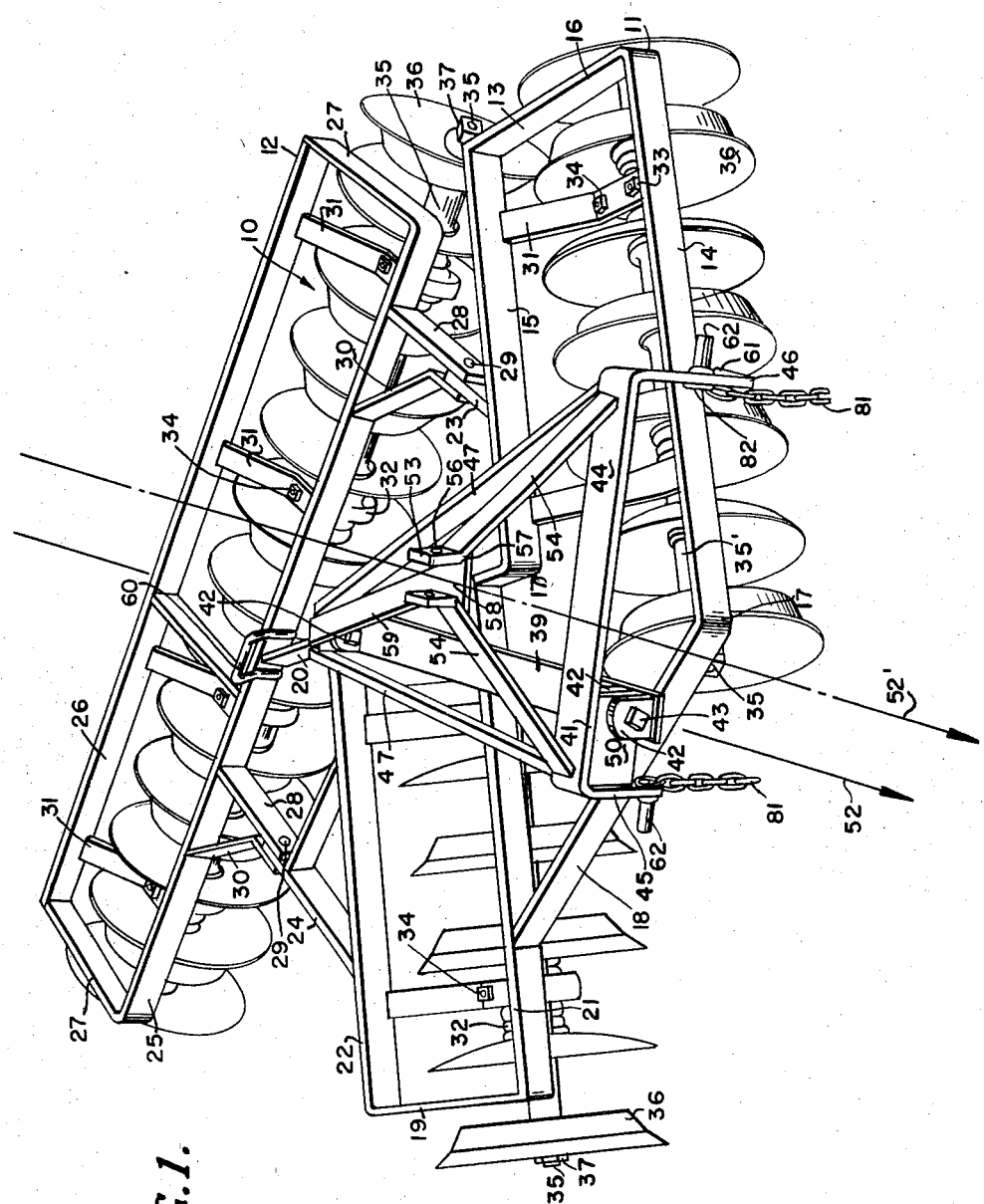
Figure 1 is a perspective view of a lift type offset grove harrow constructed in accordance with the present invention.

Referring to the drawings, 10 indicates a lift type offset disc harrow particularly adaptable for use in cultivating citrus groves and the like. The harrow is provided with a front gang frame 11 and a rear gang frame 12. The front gang frame 11 has a forward portion 13, having spaced transverse parallel arms 14 and 15 connected at the outer end by a bar 16 (Fig. 9). The opposite or inner ends of the arms 14 and 15 are each bent rearwardly as at 17. The arm 14 is formed with an inclined end portion 18 which is connected in any suitable manner, such as by welding or the like, to a rear rectangular portion 19 preferably similar in size and shape to the front portion 13 and laterally offset relative thereto.

The bar or arm 15 has a rearwardly extending end portion 20 to which the spaced transverse arms 21 and 22 of the rear portion 19 may be suitably connected, so as to provide a fixed rigid front gang frame. The bar 15 has extended rearwardly therefrom a lug or strap 23 which is parallel to a lug or a strap 24 extending from the arm 22 of the front gang frame 11 (Fig. 1). The rear gang frame 12 is preferably of rectangular shape and has a front transverse bar 25 and a parallel rear bar 26 connected by the end bars 27. Extending forwardly from the bar 25 are transversely spaced parallel arms 28 which are pivotally connected to the lugs 23 and 24 respectively by the bolts 29. Reinforced braces 30 may also be connected to the bar 25, so as to engage the lugs 23 and 24 and be connected thereto by the bolts 29 when the parts are assembled.

Figure 5:
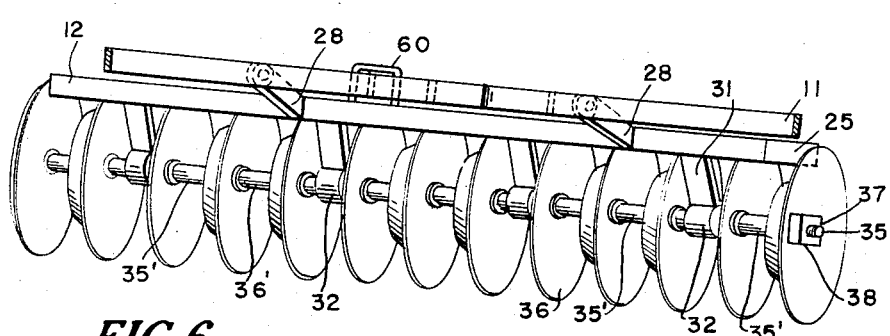
Figure 5 is a sectional view taken substantially along the line 5—5 of Figure 2.
Figure 6:
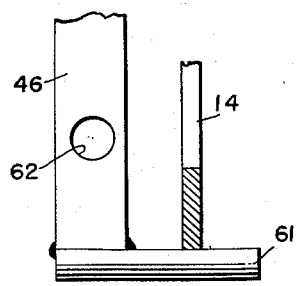
Figure 6 is a detailed sectional view taken substantially along the line 6—6 of Figure 4.

The front gang frame 11 and the rear gang frame 12 are provided with transversely spaced supporting straps 31 (Fig. 1) to which are connected sectional bearing blocks 32 by the threaded bolts 33 and retaining nuts 34. Each of the bearing blocks 32 supports a transverse axle shaft 35 of substantially the same length as the length of the gang frame with which it is associated. Each of the axles 35 carries longitudinally spaced discs 36 separated by the sleeves 35'. The ends of the shafts 35 are threaded as at 37 (Fig. 5), so as to receive the retaining nuts 38 in order to maintain the disc rotatably in fixed positions on the harrow when the parts are assembled. It will be seen that the lugs or bars 23 and 24 constitute spaced extensions of the front gang frame 11 to which the rear gang frame 12 is movably connected at transverse spaced points, so that the rear gang frame has a floating connection with the front gang frame, in order that the harrow may pass over uneven ground without plowing into the high spots or skipping over the hollows. Thus, there is provided a close coupled, flexible lift harrow, that may be efficiently used particularly, but not exclusively, for cultivating bedded citrus groves and the like, at a minimum expenditure of time, effort and cost.

A longitudinally disposed member or bar 39 is mounted on the front gang frame 11, so as to be positioned substantially parallel with the center line of the tractor 40 (Fig. 2) or other suitable draft device to which the harrow is arranged to be detachably connected, through a pivotally mounted three-point hitch frame 41. Each end of the member 39 has a pair of spaced upwardly extending lugs or arms 42 (Fig. 1) provided with aligned openings for receiving a retaining bolt 43. The hitch frame 41 has a transversely disposed inverted channel-shaped bar 44 provided at one end with a depending short arm 45 and its opposite end with a depending long arm 46 (Fig. 1). Extending rearwardly from the bar 44 adjacent the ends thereof are converging arms 47, connected by a transverse web 48 (Fig. 3) having an opening 49. The transverse bar 44 adjacent the short arm 45 has welded to the underside thereof a plate 50 (Fig. 1) having an opening 51 which registers with the opening 49 in the web 48. The plate 50 is arranged to fit between the front pair of lugs 42 on the member 39, while the web 48 fits between the rear pair of lugs, so as to pivotally connect the hitch frame 41 to the lugs by the bolts 43 when the parts are assembled. Thus, it will be seen that the hitch frame is connected to the front gang frame at spaced longitudinal points so as to allow the harrow to oscillate in a vertical plane and about an axis on the line 52 which is substantially parallel with the center line of the tractor 40, as indicated by the line 52' (Fig. 1).

Extending upwardly from the ends of the transverse member 44 of the hitch frame are a pair of transverse inclined arms 54 having parallel upwardly extending spaced end portions 53 provided with transverse openings 56. The end portions 53 are connected as at 57 to the upper end 58 of a rearwardly inclined arm 59 which is welded or otherwise connected to the rear ends of the horizontal arms 47 and the web 48. The front bar 25 of the rear gang frame 12 has an inverted U-shaped rod 60 connected thereto (Fig. 1) intermediate its ends, through which loosely extends the arm 20 of the front gang frame 11 and which constitutes a stop on the rear gang frame that contacts with the extension 20, so as to limit the downward movement of the rear gang frame. The vertically movable long arm 46 of the transverse bar 44 is provided with a rearwardly extending stop lug or flange 61 which extends beneath the front bar 14 of the gang frame 11, so as to abut the same and limit the tilting movement of the hitch frame and the downward travel of the portion 14 of the front gang frame 11.

The arms 45 and 46 are provided with outwardly transversely aligned trunnions or pins 62 arranged to fit into complementary openings in the spaced horizontal arms 63 of a three-point lift attachment 64 operable by any suitable power means (not shown). The upwardly inclined arms 54 and the rearwardly extending arm 59 of the hitch frame are connected to a horizontal arm or link 65 (Fig. 3) which fits between the spaced lugs 53 and may be connected thereto by a transverse bolt or pin 66. The lift attachment 64 may be of any well-known type and is suitably mounted on the tractor, so as to be conveniently detachably connected to the hitch frame 41 of the tractor, in order to raise and transport the harrow from place to place.

Figure 2:
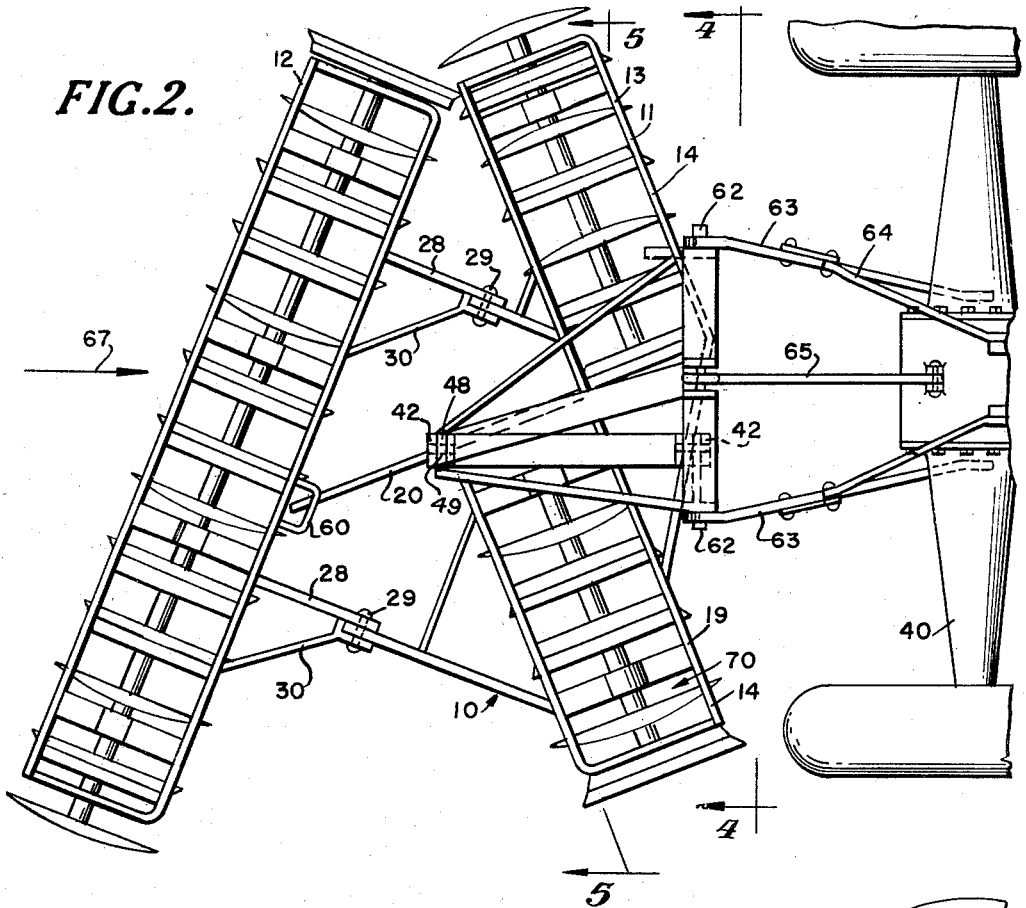
Figure 3:
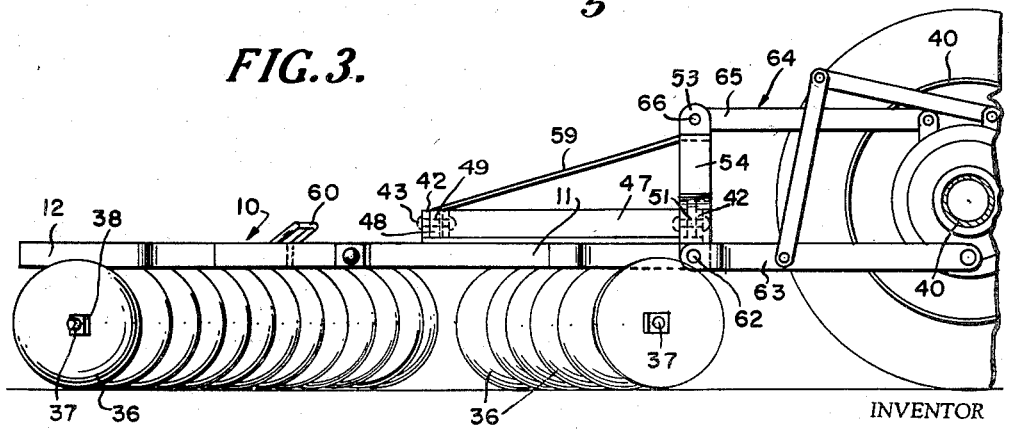
Figure 3 is a side view of Figure 2.
Figure 4:
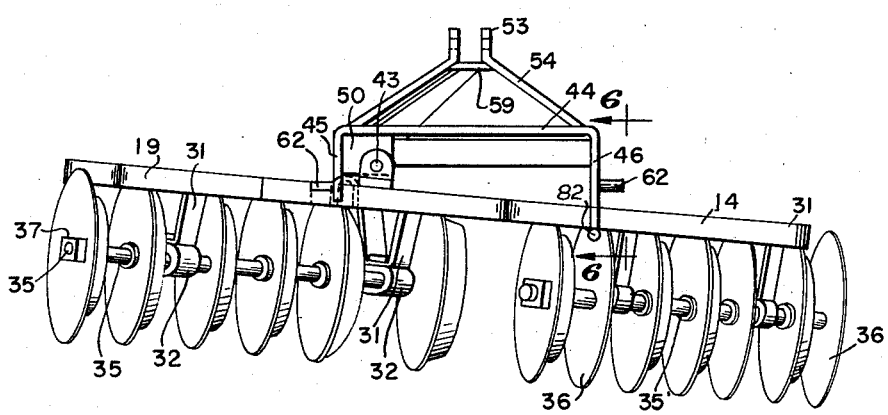
Figure 4 is a sectional view taken substantially along the line 4—4 of Figure 2 and showing the front gangs of harrows in their raised position.

Thus, it will be seen that simple, efficient, and easily operable means are provided for detachably connecting a lift type offset disc harrow 10 through a hitch frame 41 and a lift attachment 64 to a tractor or the like 40, so as to provide a low cost agricultural implement particularly efficient for use in citrus grove cultivation without danger of damaging the roots. The harrow is so mounted as to be easily maneuverable and transported from grove to grove by simply raising the harrow through the power operated lift attachment on the tractor. The pivotal or floating connection provided by the spaced transverse pivots 29 between the front gang frame 11 and the rear gang frame 12 allows the rear gang frame 12 and the discs 36 carried thereby to move over uneven ground without plowing into the high spots or skipping over the hollows. Moreover, the longitudinally spaced pivotal connections 42 and 43 of the hitch frame 41 with the front gang frame 11, allows the harrow to oscillate in a vertical plane about an axis 52 which is substantially parallel to the center line 52' of the tractor 40, as contrasted to three-point lift harrows as previously used, which remain level to the tractor so that, as the tractor tilts from side to side, it forces the ends of the harrows to "gouge in." The offset longitudinal pivot of the present invention also allows the harrow to seek its own level independently of the tractor or the irregularity of the ground over which it is passing or cultivating. This oscillating movement is accomplished by pivotally mounting the hitch frame 41 to the front gang frame 11 adjacent the rear portion 19 of the front gang frame and to the right side of the hitch frame 41 looking in the direction of travel of the harrow as indicated by the arrow 67 (Fig. 2), so as to locate this pivot near the center of gravity of the harrow 10. The oscillation or tilting of the harrow is limited to prevent the same from touching the ground when in its raised position, by allowing the front gang 11 to contact the hitch frame on the left side of the center line of the pivot 42 when the opposite or right side of the harrow is down, viewed from the forward direction of travel of the harrow as indicated by the arrow 67 (Fig. 2). This movement occurs when the right side of the harrow, that is, the rear portion 19 of the front frame 11, is tilted downwardly and the left side or front portion 14 is raised and its upward movement limited by engagement with the stop 61. Upward movement of the front frame 11 is limited by the engagement of the portion 14 with the underside of the adjacent inclined arm 47 therewith (Fig. 1).

In the modified form of the invention shown in Figures 7 and 8, the harrow 10 is arranged to be detachably connected to the tractor through the instrumentality of the fast hitch frame assembly 68, which may be readily substituted for the hitch frame 41 previously described.

The hitch frame 68 includes a transverse bar 69 (Fig. 7) to one end of which is connected a longitudinal bar 70 in any suitable manner, such as by welding or the like. An inclined bar 71 has a transverse rear end 72 which extends between the spaced rear lugs 42 on the member 39 and is welded to the adjacent end of the bar 70. The transverse bar 69 has a depending web 73 (Fig. 8) which fits between the front pair of lugs 42 on the bar 39 and has an opening arranged to register with openings in the lugs 42. Threaded bolts 74 extend through the aligned openings in the front and rear lugs 42 and the ends 72 of the bars 71 and also through the web 73 so as to receive the threaded retaining nuts 75 for detachably connecting the hitch frame 68 to the harrow 10, thus providing an offset longitudinally spaced pivoted connection between the hitch frame 68 and the harrow 10. The inclined bar 71 has a horizontal end portion 76 substantially parallel and coextensive in length with an end portion 77 of the horizontal bar 70. Transversely spaced parallel harrow prongs 78 are positioned below and overlap the end portions 76 and 77 of the bars 70 and 71 and are welded thereto as at 79 (Fig. 8). Each of the prongs 78 has a recess 80 and is arranged to be inserted into a complementary automatic coupling device (not shown), which is carried by the tractor and provided with retaining means arranged releasably to engage in the recesses 80 for locking the hitch frame assembly 68 and the harrow 10 to the tractor 40. The prong 78 welded to the end portion 76 of the bar 71 is provided with a rearwardly extending lug 82 below the bar 14 of the front frame, so as to engage the same and limit the upward movement of the hitch frame 68 relative to the harrow. This fast hitch attachment provides means for enabling the operator, after he has backed the tractor hitch into the harrow prongs 78, to raise the harrow 10 bodily off of the ground without the necessity of the operator dismounting from the tractor as is required in a three-point attachment, as previously described. Flexible members or chains 81 (Fig. 1) may be connected to the shafts 62 as at 82, so as to provide additional means connecting the harrow to the tractor.

Thus, it will be seen that, by reason of the offset pivotal connection of the hitch frame to the front gang of the harrow, the harrow oscillates in a vertical plane and about an axis parallel to the center line of the tractor. Moreover, this tilting feature allows the tractor to tilt from side to side without forcing the harrow to penetrate or "gouge in," thus improving the construction and operation of the pull-type harrows such as used in bedded citrus groves and the like. The harrow, it will be noted, is formed of a front gang frame comprising a pair of longitudinally offset harrows and a rear gang which is disposed at an acute angle to the front frame and connected thereto at longitudinally spaced points. When the harrow is raised clear of the ground by the lift assembly, member 20 on the front gang frame engages the stop 60, so as to limit the downward travel of the rear gang 12. It will be noted that the transverse center line of the spaced hinge connection 29 is substantially parallel to the rear gang frame 12, so that the gangs may tilt or move independently of each other when passing over uneven ground without plowing into the high spots or skipping over the hollows. Moreover, in all forms of the invention, the hitch frame is connected to the harrow by offset longitudinally spaced pivotal means, so that when connected to the lift attachment in the tractor, the harrow is free to oscillate in a vertical plane and about an axis substantially parallel to the center line of the tractor. When the harrow is raised clear of the ground by the lift attachment, the stop 60 limits the downward movement of the rear frame, so as to facilitate the transportation of the harrow from place to place.

It will be understood that the forms of the invention shown are merely illustrative and that such changes may be made as come within the scope of the following claims.

I claim:

1. A lift type harrow including a front frame having a forward portion and a laterally offset rear portion, a rear frame, transversely spaced means pivotally connecting the rear frame to the front frame, discs below the front and rear frames, means connecting the discs to said frames, a hitch frame having a transverse portion and a rearwardly extending portion, said transverse portion having spaced depending arms, one of said arms being shorter than the other arm, said hitch frame adjacent said short arm and said rear portion of the front gang frame having spaced means pivotally connecting the same to the front gang frame, the long arm of said hitch frame extending below the front frame and vertically displaceable relative thereto, and said long arm having means for limiting the downward tilting movement of the front frame.

2. A lift type harrow as called for in claim 1 in which the front frame has a rearwardly extending member, and said rear frame is provided with a stop for engaging said rearwardly extending member for limiting the downward movement of the rear frame.

3. In combination with a tractor or the like, a lift type disc harrow including a front gang frame having a forward portion and a laterally offset rear portion, a rear frame, transversely spaced means pivotally connecting the rear frame to the front frame, discs below the front and rear frames, means connecting the discs to said frames, a hitch frame, longitudinally spaced means pivotally connecting the hitch frame to the forward and rear portions of said front frame, the center line of the longitudinally spaced pivotal means being laterally offset relative to the center line of the hitch frame, said harrow being oscillatable in a vertical plane and about an axis substantially parallel to the center line of the tractor, and means on the hitch frame engageable with said front gang frame for limiting the tilting movement of the latter.

4. A lift type harrow including a front gang frame, a rear gang frame, means movably connecting the rear frame to the front frame at spaced longitudinal points, discs below the frames, means connecting the discs to said frames, a longitudinally disposed plate mounted on the front frame between the sides thereof, a hitch frame having a transversely disposed member provided with depending spaced arms, one of said arms being longer than the other, means pivotally connecting the hitch frame to said plate adjacent the short arm, said hitch frame having a rearwardly extending portion, means pivotally connecting the rearwardly extending portion to said plate in longitudinal alignment with the front pivotal connection to provide offset longitudinal spaced pivotal connections of the hitch frame with the harrow for oscillating the harrow in a vertical plane, and the long arm of said hitch frame extending below the front gang frame and provided with means engageable therewith for limiting the tiltable movement of the front gang frame.

5. A lift type harrow including a front gang frame having a forward portion and a laterally offset rear portion, a rear frame, transversely spaced means pivotally connecting the rear frame to the front frame, discs below the front and rear frames, means connecting the discs to said frames, a hitch frame, longitudinally spaced means pivotally connecting the hitch frame to the forward and rear portions of said front frame, the center line of the longitudinally spaced pivotal means being laterally offset relative to the center line of the hitch frame, said hitch frame having a depending portion extending below the forward portion of said front gang frame, and said depending portion provided with means for limiting the downward movement of the front gang frame.

6. A lift type harrow including a front gang frame, having a forward portion and a laterally offset rear portion, a rear frame, transversely spaced means pivotally connecting the rear frame to the front frame, discs below the front and rear frames, means connecting the discs to said frames, a hitch frame having a transverse portion and a rearwardly extending portion, said transverse portion having spaced depending arms in front of the forward portion of said front gang frame, one of said arms being shorter than the other arm, the long arm extending below said gang frame, longitudinally spaced means pivotally connecting the hitch frame to the forward and rear portions of the front gang frame adjacent the short arm, and the long arm having means projecting into the path of the front gang frame for limiting the downward movement of the latter.

7. A lift type harrow including a front gang frame having a forward transverse portion and a laterally offset rear portion, a rear frame, transversely spaced means pivotally connecting the rear frame to the front and rear portions of said front gang frame and at an acute angle relative thereto, discs beneath the front and rear frames, means connecting the discs to said frames, the forward and rear portions of said front frame having longitudinally spaced lugs provided with aligned openings, a hitch frame having a front transverse member and spaced rearwardly extending side members connected to the transverse member and to each other at their rear ends, said transverse member having depending arms extending below the front gang frame, one of said arms being longer than the other, means on the rear end of said hitch frame for pivotally connecting the same to one of said lugs, means pivotally connecting the front transverse member to the other lug adjacent the short arm of said transverse member, and means on the long arm of the said transverse member and extending below the front gang member for limiting the tilting movement of the latter.

8. A lift type harrow including a front gang frame having a forward transverse portion and a laterally offset rear portion, a rear frame, transversely spaced means pivotally connecting the rear frame to the front and rear portions of said front gang frame and at an acute angle relative thereto, discs beneath the front and rear frames, means connecting the discs to said frames, the forward and rear portions of said front frame having longitudinally spaced lugs provided with aligned openings, a hitch frame having a front transverse member and rearwardly converging longitudinal side members connected to the transverse member and to each other at the rear ends thereof, said hitch member having longitudinally spaced lugs overlapping the lugs on said front frame, means pivotally connecting adjacent lugs to each other, said transverse member having depending arms one of said arms being longer than the other arm, the longer arm projecting below and in front of the front gang frame, said long arm having means extending rearwardly therefrom and engageable with the front gang frame for limiting the tilting movement thereof, and means for detachably connecting the hitch frame to a tractor or the like.

References Cited in the file of this patent

UNITED STATES PATENTS

| | | |
|---|---|---|
| 407,463 | Ansley | July 23, 1889 |
| 2,602,389 | Markel | July 8, 1952 |
| 2,615,291 | McCleneghan | Oct. 28, 1952 |
| 2,633,686 | Domries | Apr. 7, 1953 |
| 2,646,657 | Robertson | July 28, 1953 |
| 2,656,776 | Cox | Oct. 27, 1953 |
| 2,683,960 | Love | July 20, 1954 |
| 2,737,766 | Garner | Mar. 13, 1956 |

FOREIGN PATENTS

| | | |
|---|---|---|
| 138,446 | Australia | Aug. 22, 1950 |
| 1,060,474 | France | Nov. 18, 1953 |